(12) United States Patent
Siffer et al.

(10) Patent No.: US 8,445,074 B2
(45) Date of Patent: May 21, 2013

(54) ATMOSPHERIC PLASMA TREATMENT OF TIRE CORDS

(75) Inventors: Frederic Gerard Auguste Siffer, Akron, OH (US); James Gregory Gillick, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 586 days.

(21) Appl. No.: 12/752,171

(22) Filed: Apr. 1, 2010

(65) Prior Publication Data

US 2011/0244139 A1 Oct. 6, 2011

(51) Int. Cl.
*C08F 2/46* (2006.01)

(52) U.S. Cl.
USPC .......................................................... 427/488

(58) Field of Classification Search
USPC ........................................................... 427/488
See application file for complete search history.

(56) References Cited

U.S. PATENT DOCUMENTS

| | | | |
|---|---|---|---|
| 4,606,930 A | 8/1986 | Ueno et al. | 427/40 |
| 4,636,435 A | 1/1987 | Yanagihara et al. | |
| 4,693,927 A | 9/1987 | Nishikawa et al. | |
| 5,041,304 A | 8/1991 | Kusano et al. | |
| 5,053,246 A | 10/1991 | Shuttleworth et al. | 427/40 |
| 5,283,119 A | 2/1994 | Shuttleworth et al. | 428/375 |
| 5,284,543 A * | 2/1994 | Kusano et al. | 156/272.6 |
| 5,290,378 A * | 3/1994 | Kusano et al. | 156/272.6 |
| 5,376,413 A | 12/1994 | Callebert et al. | 427/489 |
| 5,399,832 A | 3/1995 | Tanisaki et al. | |
| 5,501,880 A | 3/1996 | Parker et al. | 427/389.9 |
| 5,878,564 A | 3/1999 | De Vos et al. | |
| 6,096,156 A | 8/2000 | Morin et al. | |
| 6,120,911 A | 9/2000 | Beers et al. | 428/457 |
| 6,425,426 B1 | 7/2002 | Osborne et al. | |
| 6,613,394 B2 | 9/2003 | Kuckertz et al. | 427/488 |

(Continued)

FOREIGN PATENT DOCUMENTS

EP 0346055 A2 12/1989
EP 1302503 A2 4/2003

(Continued)

OTHER PUBLICATIONS

Database WPI, Week 200507, Thomson Scientific, London, GB, AN 2005-060977, XP002655342 & JP 2004360113A (Sekisui Chem. Ind. Co. Ltd.), Dec. 24, 2004, abstract.

(Continued)

*Primary Examiner* — Elena T Lightfoot
(74) *Attorney, Agent, or Firm* — John D. DeLong

(57) ABSTRACT

The present invention is directed to a method of treating a tire cord, comprising the steps of
 A) atomizing a mixture of at least one polymerizable monomer, a halogenated saturated hydrocarbon, and a carrier gas to form an atomized mixture;
 B) generating an atmospheric pressure plasma from the atomized mixture; and
 C) exposing the tire cord to the atmospheric pressure plasma under conditions suitable to form a polymer strongly bonded to the tire cord and capable of bonding to rubber.

11 Claims, 1 Drawing Sheet

U.S. PATENT DOCUMENTS

| | | | |
|---|---|---|---|
| 6,664,737 B1 * | 12/2003 | Berry et al. | 315/111.21 |
| 6,896,932 B2 | 5/2005 | Huang et al. | 427/421 |
| 7,353,852 B2 | 4/2008 | Hitotsuyanagi et al. | |
| 7,455,892 B2 | 11/2008 | Goodwin et al. | 427/578 |
| 7,517,561 B2 | 4/2009 | Haack et al. | 427/447 |
| 7,557,019 B2 | 7/2009 | Mikhael et al. | |
| 2004/0159382 A1 | 8/2004 | Armellin et al. | |
| 2007/0093076 A1 | 4/2007 | Mikhael et al. | |
| 2007/0202270 A1 | 8/2007 | Rose et al. | 427/585 |
| 2009/0238989 A1 | 9/2009 | Dadheech et al. | 427/489 |

FOREIGN PATENT DOCUMENTS

| | | | |
|---|---|---|---|
| EP | 2371882 A1 | 5/2011 | |
| WO | WO 03/086031 A1 | 10/2003 | |
| WO | WO 2006/048649 A1 | 5/2006 | |
| WO | WO 2006/135347 A1 | 12/2006 | |
| WO | WO 2008/057759 A2 | 5/2008 | |
| WO | WO 2008/060522 A2 | 5/2008 | |

OTHER PUBLICATIONS

Database WPI, Week 200980, Thomson Scientific, London, GB, AN 2009-R57560 XP002655343 & JP 2009275303A (Teijin Fiber KK), Nov. 26, 2009, abstract.

European Search Report, dated Aug. 2, 2011.

Internet publication, The Korean Institute of Rubber Industry, "Surface Modification of Steel Tire Cords via Plasma Etching and Plasma Polymer Coating: Part I. Adhesive properties," H. M. Kang et al., published as early as Mar. 22, 2000.

Internet publication, The Korean Institute of Rubber Industry, "Surface Modification of Steel Tire Cords via Plasma Etching and Plasma Polymer Coating: Part II. Characterization," H. M. Kang et al., published as early as Mar. 22, 2000.

Non-Final Office Action dated Sep. 11, 2012, U.S. Appl. No. 12/885,899.

Final Office Action dated Dec. 31, 2012, U.S. Appl. No. 12/885,899.

* cited by examiner

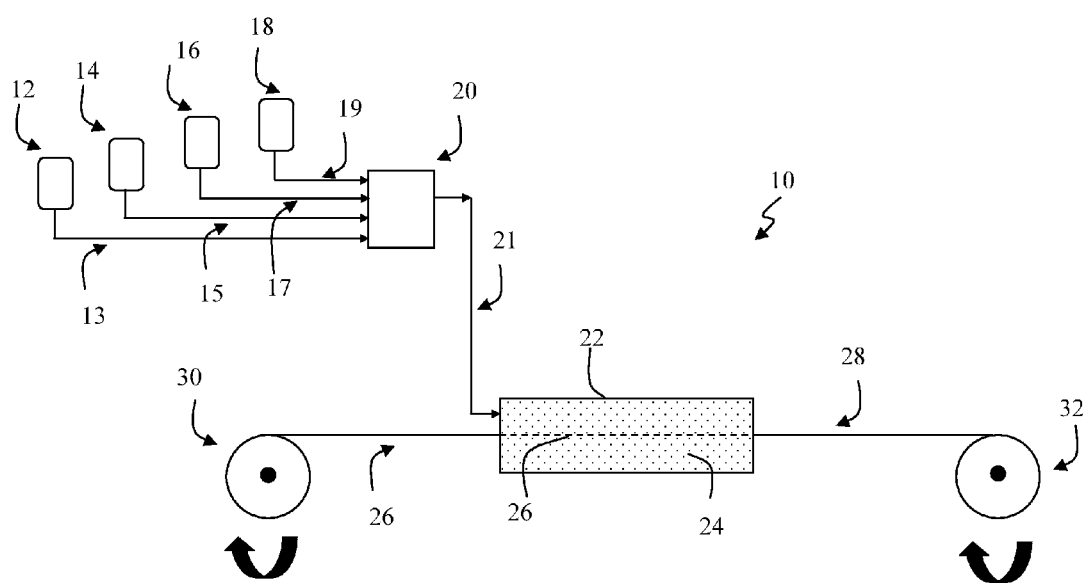

ATMOSPHERIC PLASMA TREATMENT OF TIRE CORDS

BACKGROUND

Rubber is typically reinforced with various embodiments of textile, glass or steel fibers to provide basic strength, shape, stability, and resistance to bruises, fatigue, and heat. These fibers may be twisted into plies and cabled into cords. Rubber tires of various construction as well as various industrial products such as belts, hoses, seals, bumpers, mountings, and diaphragms can be prepared using such cords.

Manufacturers of rubber reinforced articles have long realized the importance of the interfacial adhesion of reinforcement of its rubber environment. Specialized coatings such are resorcinol/formaldehyde latex adhesives for polymeric cords and brass plating for steel cords are typically applied to fiber and wire reinforcements to enable them to function effectively for tire use. In addition, the compounds used to coat these reinforcements are usually specially formulated to develop adhesion. For example, many tire manufacturers use various cobalt salts as bonding promoters in their steel cord wire coats. The bonding promoters are added through compounding. To achieve a maximum bonding strength, excessive amounts of cobalt salt are added to the wire coat. Since only a very small portion of the cobalt salt was engaged in the rubber-metal interfacial bonding reaction, most of the cobalt salts remained in the compound as excess cobalt without any contribution to the bonding. Cobalt is expensive and may even cause aging problems of the rubber when used in excess.

It continuously remains desirable to improve adhesion of a tire cords to rubber while simultaneously improving the properties of the coat compounds and reducing their cost.

SUMMARY OF THE INVENTION

The present invention is directed to a method of treating a tire cord, comprising the steps of
A) atomizing a mixture of at least one polymerizable monomer, a halogenated saturated hydrocarbon, and a carrier gas to form an atomized mixture;
B) generating an atmospheric pressure plasma from the atomized mixture; and
C) exposing the tire cord to the atmospheric pressure plasma under conditions suitable to form a polymer strongly bonded to the tire cord and capable of bonding to rubber.

BRIEF DESCRIPTION OF THE DRAWINGS

The sole drawing is a schematic representation of one embodiment of the present invention.

DETAILED DESCRIPTION OF THE INVENTION

There is disclosed a method of treating a tire cord, comprising the steps of
A) atomizing a mixture of at least one polymerizable monomer, a halogenated saturated hydrocarbon, and a carrier gas to form an atomized mixture;
B) generating an atmospheric pressure plasma from the atomized mixture; and
C) exposing the tire cord to the atmospheric pressure plasma under conditions suitable to form a polymer strongly bonded to the tire cord and capable of bonding to rubber.

With reference now to the drawing, one embodiment of a method of treating a tire cord according to the present invention is illustrated. In the process 10, carrier gas 13 is fed from storage vessel 12 to atomizer 20 along with monomer 15 from storage vessel 14, halogenated saturated hydrocarbon 17 from storage vessel 16. Optionally, one or more curatives 19 may be added from storage vessel 18. Carrier gas 13, monomer 15, halogenated saturated hydrocarbon 17 and optional curative 19 are atomized in atomizer 20 to form atomized mixture 21. Atomized mixture 21 is sent to plasma generator 22, where atmospheric plasma 24 is generated from atomized mixture 21. Tire cord 26 is unwound from spool 30 and conveyed through plasma generator 22 and atmospheric plasma 24 for deposition of a surface treatment by the plasma 24. Treated tire cord 28 exits plasma generator 22 and is wound onto spool 32 for storage.

The plasma generator may be any suitable plasma generation device as are known in the art to generate atmospheric pressure plasmas, such as atmospheric pressure plasma jet, atmospheric pressure microwave glow discharge, atmospheric pressure glow discharge, and atmospheric dielectric barrier discharge. In one embodiment, the plasma generator is of the dielectric barrier discharge type. The dielectric barrier discharge apparatus generally includes two electrodes with a dielectric-insulating layer disposed between the electrodes and operate at about atmospheric pressures. The dielectric barrier discharge apparatus does not provide one single plasma discharge, but instead provides a series of short-lived, self terminating arcs, which on a long time scale (greater than a microsecond), appears as a stable, continuous, and homogeneous plasma. The dielectric layer serves to ensure termination of the arc. Further reference may be made to U.S. Pat. No. 6,664,737 for its teaching regarding the operation of a dielectric barrier discharge apparatus.

By atmospheric pressure plasma, it is meant that the pressure of the plasma is equal to or slightly above the ambient pressure of the surroundings. The pressure of the plasma may be somewhat higher than ambient, such that the plasma pressure is sufficient to induce the desired flow rate through the atomizer and plasma generator.

The atomized mixture includes a carrier gas, at least one monomer, and a halogenated saturated hydrocarbon.

Suitable carrier gas includes any of the noble gases including helium, argon, xenon, and neon. Also suitable as carrier gas are oxygen, nitrogen, carbon dioxide, and air. In one embodiment, the carrier gas is argon.

Suitable monomers include any of the various monomers used to produce elastomers for use in tires. Such monomers include conjugated diolefin monomers and vinyl aromatic monomers. The conjugated diolefin monomers generally contain from 4 to 12 carbon atoms. In particular 1,3-butadiene and isoprene may be used. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Further suitable are short chain length oligomers of polybutadiene and polyisoprene. Also suitable is squalene.

Some further representative examples of ethylenically unsaturated monomers that can potentially be used include alkyl acrylates, such as methyl acrylate, ethyl acrylate, butyl acrylate, methyl methacrylate and the like; vinylidene monomers having one or more terminal $CH_2=CH-$ groups; vinyl aromatics such as styrene, $\alpha$-methylstyrene, bromostyrene, chlorostyrene, fluorostyrene and the like; $\alpha$-olefins such as ethylene, propylene, 1-butene and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; $\alpha,\beta$-olefinically unsaturated nitriles, such as acrylonitrile and methacrylonitrile; $\alpha,\beta$-olefinically unsaturated amides, such as acrylamide, N-methyl acrylamide, N,N-dimethylacrylamide, methacrylamide and the like.

Vinyl aromatic monomers are another group of ethylenically unsaturated monomers which may be used. Such vinyl aromatic monomers typically contain from 8 to 20 carbon atoms. Usually, the vinyl aromatic monomer will contain from 8 to 14 carbon atoms. In one embodiment the vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

The amount of monomer may be expressed as a percent of the total components in the atomized mixture excluding the carrier gas, i.e. on a carrier gas free basis. In one embodiment, the amount of monomer ranges from 10 to 50 percent by weight of the total components in the atomized mixture on a carrier gas free basis. In one embodiment, the amount of monomer ranges from 20 to 40 percent by weight of the total components in the atomized mixture on a carrier gas free basis.

Suitable halogenated saturated hydrocarbon includes for example dichloromethane (methylene chloride). Other examples include trichloromethane (chloroform), carbon tetrachloride, trichloroethane, chlorobutane, bromoethane, dibromomethane (methylene bromide), and tribromomethane (bromoform).

The amount of halogenated saturated hydrocarbon may be expressed as a percent of the total components in the atomized mixture with the exception of the carrier gas, i.e. on a carrier gas free basis. In one embodiment, the amount of halogenated saturated hydrocarbon ranges from 90 to 50 percent by weight of the total components in the atomized mixture on a carrier gas free basis. In one embodiment, the amount of halogenated saturated hydrocarbon ranges from 80 to 60 percent by weight of the total components in the atomized mixture on a carrier gas free basis.

Optionally, the atomized mixture may include at least one curative, such as sulfur donors and accelerators. Alternatively, curatives may be absent from the material deposited on the tire cord from the atmospheric plasma. In this case, curatives present in a rubber composition contacted with the tire cord may serve to cure the deposited material via migration of the curatives from the rubber composition to the material deposited on the cord prior to cure. When used in the atomized mixture, curatives may be present in an amount ranging from 0.5 to 2 percent by weight on a carrier gas free basis.

The tire cord is constructed of any of the various reinforcement materials commonly used in tires. In one embodiment, the tire cord includes steel and polymeric cords. Polymeric cords may include any of the various textile cords as are known in the art, including but not limited to cords constructed from polyamide, polyester, polyketone, rayon, and polyaramid.

The tire cord is exposed to the atmospheric plasma for a time sufficient to deposit an adhesively effect amount of polymerized or partially polymerized monomer onto the cord surface. By adhesively effective amount, it is meant that the treated cord will show increased adhesion to a cured rubber compound as measured by a standard adhesion test, such as ASTM Standard D2229-73. Generally, the exposure time required will depend on the concentration of monomer in the atomized mixture, the flow rate of atomized mixture into the plasma generator, and the power input to the plasma generator. For a batch process wherein stationary cord is exposed to an atmospheric plasma, the cord is exposed for from 1 to 100 seconds. In a continuous process, the exposure time may be characterized by a residence time expressed as the cord path length (e.g. in centimeters) through the plasma generator divided by the cord transit rate (e.g. in cm/sec). The residence time in such a continuous process would then range from 1 to 100 seconds.

The flow rate of atomized mixture into the plasma generator necessary to obtain an adhesively effective amount of polymerized or partially polymerized monomer onto the cord surface will depend on the desired face velocity in the plasma generator, i.e. the gas velocity (e.g. in cm/sec) passing perpendicular to a characteristic internal cross-sectional area of the plasma generator. Necessary flow rate may be determined by one skilled in the art without undue experimentation.

The atmospheric pressure plasma treated cord is generally used in a component of a pneumatic tire. The treated cord is calendered or otherwise contacted with a rubber composition to form the tire component using procedures as are known in the art. In various embodiments, the tire component may be a belt, carcass, apex, bead, chipper, flipper, or any other component including a cord reinforcement as are known in the art.

In one embodiment, the tire component is a steel belt wherein treated steel tire cords are calendared into a rubber composition. In one embodiment, the tire component is a tire carcass wherein polymeric tire cords are contacted with a plycoat rubber composition.

It is readily understood by those having skill in the art that the rubber compositions used in tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The rubber compound may contain various conventional rubber additives. In one embodiment, the addition of carbon black comprises about 10 to 200 parts by weight of diene rubber (phr). In another embodiment, from about 20 to about 100 phr of carbon black is used.

A number of commercially available carbon blacks may be used. Included in the list of carbon blacks are those known under the ASTM designations N299, N315, N326, N330, M332, N339, N343, N347, N351, N358, N375, N539, N550 and N582. Such processing aids may be present and can include, for example, aromatic, naphthenic, and/or paraffinic processing oils. Typical amounts of tackifying resins, such as phenolic tackifiers, range from 1 to 3 phr. Silica, if used, may be used in an amount of about 5 to about 100 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2,2,4-trimethylquinoline and others, such as, for example, those disclosed in the *Vanderbilt Rubber Handbook* (1990), Pages 343 through 362. Typical amounts of antiozonants comprise about 1 to about 5 phr. Representative antiozonants may be, for example, those disclosed in the *Vanderbilt Rubber Handbook* (1990), Pages 363 through 367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. In one embodiment, the sulfur vulcanizing agent is elemental sulfur. In one embodiment, sulfur vulcanizing agents are used in an amount ranging from about 0.5 to about 8 phr. In another embodiment about 3 to about 5 phr of sulfur vulcanizing agents are used.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.5 phr. In another embodiment, combinations of two or more accelerators may be used, including a primary accelerator which is generally used in the larger amount (0.5 to 2.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. In another embodiment, if a second accelerator is used, the secondary accelerator may be a guanidine, dithiocarbamate or thiuram compound.

The rubber compound may contain any of the cobalt materials known in the art to further promote the adhesion of rubber to metal in the case of the use of steel tire cords. One advantage of the present invention is the reduction and possible elimination of cobalt compounds. However, it may be desirable to have some amounts that are present. Thus, suitable cobalt materials which may be employed include cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex commercially available under the designation Manobond C from Wyrough and Loser, Inc, Trenton, N.J. Manobond C is believed to have the structure:

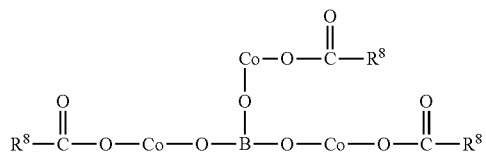

in which $R^8$ is an alkyl group having from 9 to 12 carbon atoms.

Amounts of cobalt compound which may be employed depend upon the specific nature of the cobalt material selected, particularly the amount of cobalt metal present in the compound.

In one embodiment, the amount of the cobalt material may range from about 0.2 to 5 phr. In another embodiment, the amount of cobalt compound may range from about 0.5 to 3 phr. In one embodiment, the amount of cobalt material present in the stock composition is sufficient to provide from about 0.01 percent to about 0.50 percent by weight of cobalt metal based upon total weight of the rubber stock composition. In another embodiment, the amount of cobalt material present in the stock composition is sufficient to provide from about 0.03 percent to about 0.2 percent by weight of cobalt metal based on total weight of wire coat composition.

In the case of polymeric tire cords, the atmospheric pressure plasma treated cord may be further treated with one or more of RFL (resorcinol-formaldehyde-latex), isocyanate or epoxide type dips. Such dips are well known to those skilled in the art.

The tire containing the tire component can be built, shaped, molded and cured by various methods which will be readily apparent to those having skill in such art.

The prepared tire of this invention is conventionally shaped and cured by methods known to those having skill in such art.

The invention is further described with reference to the following examples.

EXAMPLE 1

In this example, the effect of treating a steel tire cord with an atmospheric plasma generated by dielectric barrier discharge is illustrated. A laboratory dielectric barrier discharge apparatus was constructed consisting of a quartz tube with aluminum tape electrodes wrapped at a spaced interval on the exterior of the tube, with a first electrode connected to a high voltage power supply and a second electrode grounded. Argon gas at atmospheric pressure was atomized with mixture of 20 weight percent squalene, 5 weight percent sulfur and 75 weight percent dichloromethane and was passed through the interior of the quartz tube (all amounts given on a carrier gas free basis). A steel tire cord of 3+5×7×0.15 galvanized construction was extended through the interior of the quartz tube and held stationary. Application of high voltage to the first electrode ignited a plasma in the quartz tube.

A series of experiments exposing a steel cord to a plasma was performed, using various power input to electrode, various exposure times of the steel cord to the plasma, and various argon gas flow rates into the quartz tube. The resulting plasma treated steel cords were embedded to a depth of 19 mm into a standard rubber wirecoat compound for passenger tires and cured at 155° C. for 35 minutes. Each cured wire/rubber sample was then tested for adhesion using a single wire adhesion test (SWAT) according to ASTM Standard D2229-73. The results of these pull-out tests (SWAT) and percent rubber coverage are given in Table 1.

TABLE 1

Control Values for:
3 + 5 × 7 × 0.15 brass plated cord: SWAT 590N, Coverage 55-65%
3 + 5 × 7 × 0.15 galvanized cord: SWAT 253N, Coverage 0-5%

| Sample No. | Exposure Time, sec | Input Power, W | Argon Rate, L/min | SWAT Adhesion, N | Rubber Coverage, % |
|---|---|---|---|---|---|
| 1 | 14 | 60 | 13 | 491 | 10 |
| 2 | 2 | 60 | 3 | 414 | 5 |
| 3 | 14 | 15 | 3 | 342 | 0-5 |
| 4 | 2 | 60 | 13 | 382 | 5 |
| 5 | 2 | 15 | 3 | 501 | 15 |
| 6 | 14 | 60 | 3 | 487 | 15 |

TABLE 1-continued

Control Values for:
3 + 5 × 7 × 0.15 brass plated cord: SWAT 590N, Coverage 55-65%
3 + 5 × 7 × 0.15 galvanized cord: SWAT 253N, Coverage 0-5%

| Sample No. | Exposure Time, sec | Input Power, W | Argon Rate, L/min | SWAT Adhesion, N | Rubber Coverage, % |
|---|---|---|---|---|---|
| 7 | 14 | 15 | 13 | 549 | 15-20 |
| 8 | 2 | 15 | 13 | 309 | 0-5 |
| 9 | 8 | 35 | 8 | 323 | 0-5 |
| 10 | 14 | 35 | 8 | 406 | 10 |
| 11 | 2 | 35 | 8 | 413 | 10 |
| 12 | 8 | 60 | 8 | 350 | 0-5 |
| 13 | 8 | 15 | 8 | 373 | 5 |
| 14 | 8 | 35 | 13 | 509 | 15 |
| 15 | 8 | 35 | 3 | 418 | 10 |
| 16 | 8 | 60 | 13 | 470 | 15-20 |
| 17 | 8 | 15 | 3 | 398 | 10 |
| 18 | 14 | 60 | 8 | 354 | 0-5 |
| 19 | 2 | 15 | 8 | 398 | 5 |
| 20 | 14 | 35 | 13 | 502 | 20-25 |
| 21 | 2 | 35 | 3 | 363 | 0-5 |
| 22 | 8 | 60 | 3 | 319 | 0-5 |
| 23 | 8 | 15 | 13 | 434 | 5 |
| 24 | 14 | 15 | 8 | 515 | 15 |
| 25 | 2 | 60 | 8 | 465 | 10 |
| 26 | 14 | 35 | 3 | 400 | 15 |
| 27 | 2 | 35 | 13 | 325 | 0-5 |

As seen in the data of Table 1, the exposure of galvanized steel tire cord to the atmospheric plasma resulted in deposit of an adhesively effective amount of material onto the tire cord. In this case, the level of adhesion of rubber to plasma treated galvanized cord was comparable to the level of adhesion of rubber to brass plated cord.

XPS and nano-SIMS analysis of the coatings showed that the coatings with high levels of adhesion showed a homogeneous, essentially defect-free coating with uniform distributions of sulfur, chlorine, and unsaturated (olefinic) carbon. The coatings were also notable in that there was not a high level of oxygen and nitrogen incorporation as is typically seen in atmospheric plasma polymers. Table 2 shows the atomic concentrations obtained by XPS analysis of the major elements composing the plasma coating for five different samples for which the process conditions are described in Table 3.

TABLE 2

| | XPS atomic concentrations (%) | | | | | |
|---|---|---|---|---|---|---|
| | C(1s) | O(1s) | N(1s) | Cl(2p) | Zn(2p3/2) | S(2p) |
| Sample 1 | 52.4 | 4.4 | 0.3 | 42.5 | 0.4 | 0 |
| Sample 2 | 58.5 | 7 | 0.4 | 33.7 | 0.4 | 0 |
| Sample 3 | 46.6 | 4.1 | 0.2 | 48.5 | 0.6 | 0 |
| Sample 4 | 56.2 | 9.5 | 0.5 | 33.2 | 0.6 | 0 |
| Sample 5 | 61.8 | 7.2 | 0.9 | 25.8 | 0.8 | 3.5 |
| Reference: solvent cleaned sample | 52.5 | 39.6 | 1.3 | 1.1 | 5.5 | 0 |

TABLE 3

| | Composition of liquid precursor mixtures (%) | | | Process conditions | |
|---|---|---|---|---|---|
| | Squalene | Methylene chloride | Organic poly-sulfide | plasma power - sample exposure time | Ionization gas - flow rate |
| Sample 1 | 20 | 80 | 0 | 60 W - 10 sec. | Argon - 10 L/min |
| Sample 2 | 0 | 100 | 0 | 60 W - 10 sec. | Helium - 10 L/min |
| Sample 3 | 10 | 90 | 0 | 60 W - 10 sec. | Argon - 10 L/min |
| Sample 4 | 20 | 80 | 0 | 60 W - 10 sec. | Helium - 5 L/min |
| Sample 5 | 15 | 80 | 5 | 60 W - 10 sec. | Argon - 10 L/min |

What is claimed is:

1. A method of treating a tire cord, comprising the steps of
A) atomizing a mixture of at least one polymerizable monomer selected from the group consisting of isoprene, butadiene, squalene, and styrene, a halogenated saturated hydrocarbon, and a carrier gas to form an atomized mixture, wherein the at least one monomer is present in a concentration range of from 10 to 50 percent by weight on a carrier gas free basis, and wherein the halogenated saturated hydrocarbon is present in a concentration range of from 90 to 50 percent by weight on a carrier gas free basis;
B) generating an atmospheric pressure plasma from the atomized mixture; and
C) exposing the tire cord to the atmospheric pressure plasma, wherein the tire cord is a steel tire cord.

2. The method of claim 1, wherein the plasma is generated by dielectric barrier discharge.

3. The method of claim 1, wherein the tire cord is conveyed continuously during exposure to the atmospheric pressure plasma.

4. The method of claim 1, wherein the carrier gas is selected from the group consisting of argon, helium, neon, xenon, oxygen, nitrogen, and carbon dioxide.

5. The method of claim 1, wherein the atomized mixture further comprises at least one curative.

6. The method of claim 1, wherein the halogenated saturated hydrocarbon is selected from the group consisting of dichloromethane (methylene chloride), trichloromethane (chloroform), carbon tetrachloride, trichloroethane, chlorobutane, bromoethane, dibromomethane (methylene bromide), and tribromomethane (bromoform).

7. The method of claim 1, wherein the halogenated saturated hydrocarbon is dichloromethane.

8. The method of claim 5, wherein the at least one curative is selected from the group consisting of sulfur donors and accelerators.

9. The method of claim 1, wherein an adhesively effective amount of material is deposited on the tire cord during exposure of the tire cord to the atmospheric pressure plasma.

10. The method of claim 1, wherein the at least one monomer is present in a concentration range of from 20 to 40 percent by weight on a carrier gas free basis.

11. The method of claim 1, wherein the halogenated saturated hydrocarbon is present in a concentration range of from 80 to 60 percent by weight on a carrier gas free basis.

* * * * *